(12) United States Patent
Yardley

(10) Patent No.: US 10,733,981 B2
(45) Date of Patent: Aug. 4, 2020

(54) DIGITAL MESSAGING SYSTEM

(71) Applicant: JPY Limited, Surrey (GB)

(72) Inventor: John Paul Yardley, Surrey (GB)

(73) Assignee: THREADS SOFTWARE LIMITED (GB)

( * ) Notice: Subject to any disclaimer, the term of this patent is extended or adjusted under 35 U.S.C. 154(b) by 558 days.

(21) Appl. No.: 15/309,935

(22) PCT Filed: Feb. 27, 2015

(86) PCT No.: PCT/GB2015/050580
§ 371 (c)(1),
(2) Date: Nov. 9, 2016

(87) PCT Pub. No.: WO2015/173538
PCT Pub. Date: Nov. 19, 2015

(65) Prior Publication Data
US 2017/0221478 A1    Aug. 3, 2017

(30) Foreign Application Priority Data
May 12, 2014 (GB) .................................. 1408302.6

(51) Int. Cl.
| | |
|---|---|
| *G10L 15/18* | (2013.01) |
| *H04L 12/58* | (2006.01) |
| *G10L 17/00* | (2013.01) |
| *G10L 15/26* | (2006.01) |
| *G10L 17/22* | (2013.01) |
| *H04L 29/08* | (2006.01) |
| *H04M 3/22* | (2006.01) |
| *G10L 15/08* | (2006.01) |

(52) U.S. Cl.
CPC .......... *G10L 15/1815* (2013.01); *G10L 15/26* (2013.01); *G10L 17/00* (2013.01); *G10L 17/005* (2013.01); *G10L 17/22* (2013.01); *H04L 51/10* (2013.01); *H04L 51/16* (2013.01); *H04L 51/36* (2013.01); *H04L 67/30* (2013.01); *H04M 3/2281* (2013.01); *G10L 2015/088* (2013.01); *H04M 2203/301* (2013.01)

(58) Field of Classification Search
None
See application file for complete search history.

(56) References Cited

U.S. PATENT DOCUMENTS

| | | | | |
|---|---|---|---|---|
| 6,546,386 | B1 * | 4/2003 | Black | G06Q 30/02 |
| 6,658,389 | B1 * | 12/2003 | Alpdemir | G06Q 30/02 |
| | | | | 704/270 |
| 2002/0010614 | A1 * | 1/2002 | Arrowood | G06Q 10/06375 |
| | | | | 705/7.37 |

(Continued)

FOREIGN PATENT DOCUMENTS

| | | | | |
|---|---|---|---|---|
| EP | 1109390 | A2 * | 6/2001 | ........ H04M 3/53333 |
| EP | 1525577 | B1 | 4/2005 | |

*Primary Examiner* — Tonia L Dollinger
*Assistant Examiner* — Ishrat Rashid
(74) *Attorney, Agent, or Firm* — Burns & Levinson, LLP; Joseph M. Maraia

(57) ABSTRACT

A digital messaging system is arranged to aggregate digital messages from a plurality of sources, the system comprising context extraction means arranged to extract context information from the messages and classification means arranged to classify the messages according to the extracted context information.

11 Claims, 10 Drawing Sheets

(56) References Cited

U.S. PATENT DOCUMENTS

| | | | |
|---|---|---|---|
| 2003/0036905 A1* | 2/2003 | Toguri | G10L 17/02 |
| | | | 704/250 |
| 2004/0230572 A1* | 11/2004 | Omoigui | G06F 16/24575 |
| 2007/0041522 A1* | 2/2007 | Abella | H04M 3/5307 |
| | | | 379/88.14 |
| 2010/0293170 A1* | 11/2010 | Hall | H04L 51/32 |
| | | | 707/750 |
| 2010/0322395 A1 | 12/2010 | Michaelis et al. | |
| 2011/0040745 A1* | 2/2011 | Zaydman | G06F 16/284 |
| | | | 707/714 |
| 2011/0153686 A1* | 6/2011 | Campbell | G06Q 30/02 |
| | | | 707/812 |
| 2011/0195691 A9* | 8/2011 | Maguire | H04M 1/274583 |
| | | | 455/412.1 |
| 2012/0124147 A1* | 5/2012 | Hamlin | H04L 51/36 |
| | | | 709/206 |

\* cited by examiner

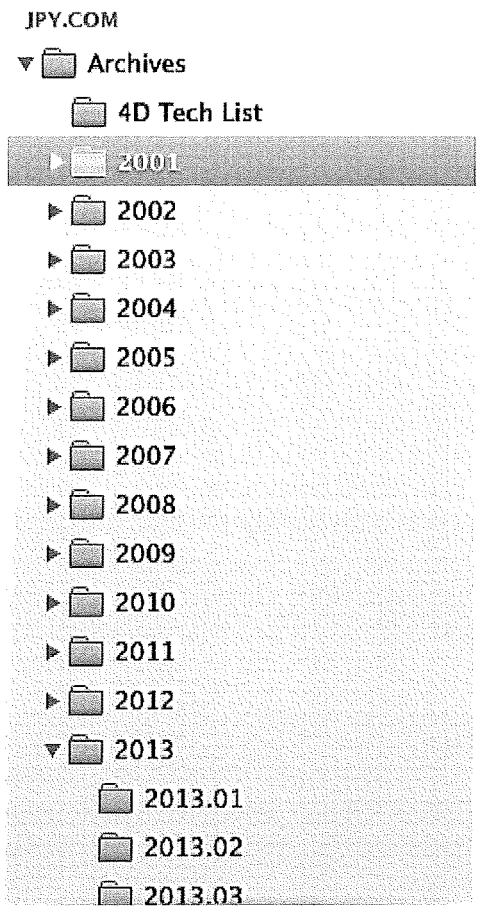

Figure 11

| | | | | Companies (274) | Contacts (1386) | Messages (3811) | Projects (61) | | Settings |
|---|---|---|---|---|---|---|---|---|---|
| | | | | | Message Date | Is after | 25/07/2014 | | Reset |
| | | | | | Select... | Contains | | | |
| ction... | | | | | ☑ Inactive Contacts | ☑ Contacts I know | ☑ Contacts I might know | ☑ Contacts I don't know | |
| | | | Company | | Sender | Recipients | Subject | | Date |
| ▶ | ✉ | | To Archiware GmbH | | Fox, David | Doods, Josef | Re: Hotel | | 25/08/2 |
| ▶ | ✉ | | From Archiware GmbH | | Doods, Josef | Fox, David | Hotel | | 25/08/2 |
| ▶ | ✉ | | From Security Metrics | | Nielsen, Matt | Yardley, John | SecurityMetrics Auto Renewal Declined | | 25/08/2 |
| ▶ | ✉ | | To Kingshay Farming | | Fox, David | Simpson, Richard (+2) | Re: IT Security: follow up | | 25/08/2 |
| ▶ | ✉ | | To IO Integration Ltd | | Fox, David | Watson, Mike | Re: Delta Group – Archiware P5 – JPY Enquiry Ref: 9111 | | 25/08/2 |
| ▶ | ✉ | | From Security Metrics | | SecurityMetrics | Yardley, John | SecurityMetrics Receipt | | 25/08/2 |
| ▶ | ✉ | | To | | Yardley, John | Sabbia, Hotel (+1) | Re: Vacanze 2014 | | 25/08/2 |

Figure 12

Message/Job relations

Project Details
- Project Parent's Name:
- Project Name: Knowledge Transfer Partnership
- Customer Reference:
- Project Internal Reference: 001271.D18
- IMAP Folder Path:
- Is Active ☑
- Comments: KTP project with Kingston University
- Tags: KTP

Figure 14

DIGITAL MESSAGING SYSTEM

RELATED APPLICATIONS

This application is the U.S. National Stage of International Application No. PCT/GB2015/050580, filed Feb. 27, 2015, which claims priority to GB Application No. 1408302.6, filed May 12, 2014, the entire contents of which are incorporated herein by reference.

FIELD OF THE INVENTION

The present invention relates to a digital messaging system, particularly but not exclusively to a system for collecting and unifying digital messages so they may be searched and shared amongst a community of users.

BACKGROUND OF THE INVENTION

Companies and organisations can be well described by the communications between staff and third-parties. Without communication, nothing happens. Business plans, growth strategies, deliveries, orders, invoices, appraisals and the like are mostly communicated by email or by telephone. Even important face-to-face discussions—which may not normally be recorded—are ultimately summarised, written down and communicated via email or telephone. In most companies, email and telephone calls are available only to the parties involved in the discussion and hence there is a large amount of information locked up in private email accounts and telephone recording systems. Although the digital nature of modern communications allows for storage and retrieval, there are practical (engineering), strategic and cultural obstacles to allowing these communications to be shared and searched.

Various solutions have been proposed in an attempt to allow communication sharing. For example, document management systems exist which purport to track and store email conversations according to the context of their content. However, such systems generally do so by simply tracking tokens embedded when the communication is initiated. These systems fail to see changes in content as the conversation evolves, or to include new messages from initially unrelated parties.

The integration of voice communications into a digital messaging system provides even greater challenges. Voice communications can account for a large percentage of information content but in their raw, digitised form, they cannot be searched for text strings. In order to do this, speech recognition algorithms must be applied to convert speech into text, while speech recognition accuracy is highly affected by speaker training and context.

SUMMARY OF THE INVENTION

The present invention aims to address the above problems. For example, in one aspect, the present invention aims to use digital processing architectures to organise and present large amounts of data to the user in a way that can be assimilated quickly, easily and securely.

According to an aspect of the invention, there is provided a digital messaging system arranged to aggregate digital messages from a plurality of sources, the system comprising context extraction means arranged to extract context information from the messages and classification means arranged to classify the messages according to the extracted context information.

By classifying, or 'threading' the messages based on the context of their content, the system according to embodiments of the invention is able to unify digital messages from a plurality of sources, including for example emails and digitised voice communications, so that they may be categorised, searched and analysed identically.

The system may further comprise attributing messages classified as having a determined context to a message group that has the same context.

By automatically attributing messages to message groups based on context, such groups also referred to as logical projects, the system in some embodiments is able to obviate the need for users to construct complex searches to find specific messages. Instead, it permits users to browse projects rather than search messages.

The system may store messages having the same context information as a message thread, while excluding messages from the message thread based on a user's security/privacy settings.

The system may further comprise a speech recogniser arranged to use the extracted context information to convert a portion of digitised speech into one or more keywords that correspond to the context.

According to a further aspect of the invention, there is provided a digital messaging system arranged to store a plurality of first messages associated with a context, the system comprising context extraction means arranged to extract context information from one or more of the first messages; and a speech recogniser arranged to use the extracted context information to convert a portion of digitised speech in a second message into one or more keywords that correspond to the context.

The system may be further arranged to store the second message as a message associated with the context.

Context information is extracted from relevant messages such as emails to help extract keywords in speech at higher recognition rates than might be expected from utterances analysed without context.

The system may further comprise a speech analyser arranged to analyse speech waveforms to identify speakers. A message associated with an identified speaker can then be stored in conjunction with the identified speaker.

This may be achieved in a way that is independent of the specific speech analysis algorithms used so that as the technology advances, the system may take immediate benefit from it.

By relating messages to a known database of individual contacts, the system may be able to use information contained in textual messages to obtain a level of speech recognition and speaker identification accuracy in excess of that available for acoustic messages processed in isolation.

As described above, a system according to aspects of the invention may aggregate any type of digital message for any arbitrary number of people. In a transaction between two or more parties, communication channels between parties can include face-to-face discussions, telephone calls, written documents, emails and various messaging systems (Skype, Facetime, texts, Tweets, etc). Depending on the percentage of digital communications made and captured, embodiments of the system make it possible to extract considerably more knowledge than would be available from individual communications. For example, by processing messages from several employees relating to the same project, the system may be able to extract strategic information not available for messages processed in isolation.

A system according to aspects of the invention may obviate the need for staff to treat their mail specially. It allows staff to continue to use their preferred email services (clients and servers) and not change their working practices. It allows them to inspect and search all of their company's mail as easily, if not more easily than just their own. Since the quantity of mail being searched is a function of the number of employees, this clearly has efficiency implications.

The skilled person will appreciate that while the system as described may be used in a business context, the technical elements which make this possible reside in the digital system architecture. Normally, the complexity of searching across many users and many types of message would make such a system unworkable. However, as a result of features such as context extraction from messages, message classification or threading and attribution or assignment of the resulting classified messages to message groups, the need for complex search strategies can be obviated, with the information obtained by browsing the groups instead.

BRIEF DESCRIPTION OF THE DRAWINGS

Embodiments of the invention will now be described by way of example, with reference to the accompanying drawings, in which:

FIG. 11 illustrates an example of an IMAP folder organisation;

FIG. 12 illustrates the use of familiarity attributes;

FIG. 14 is a worked example of how a test message is compared and scored against a job;

DETAILED DESCRIPTION

Figure 1:
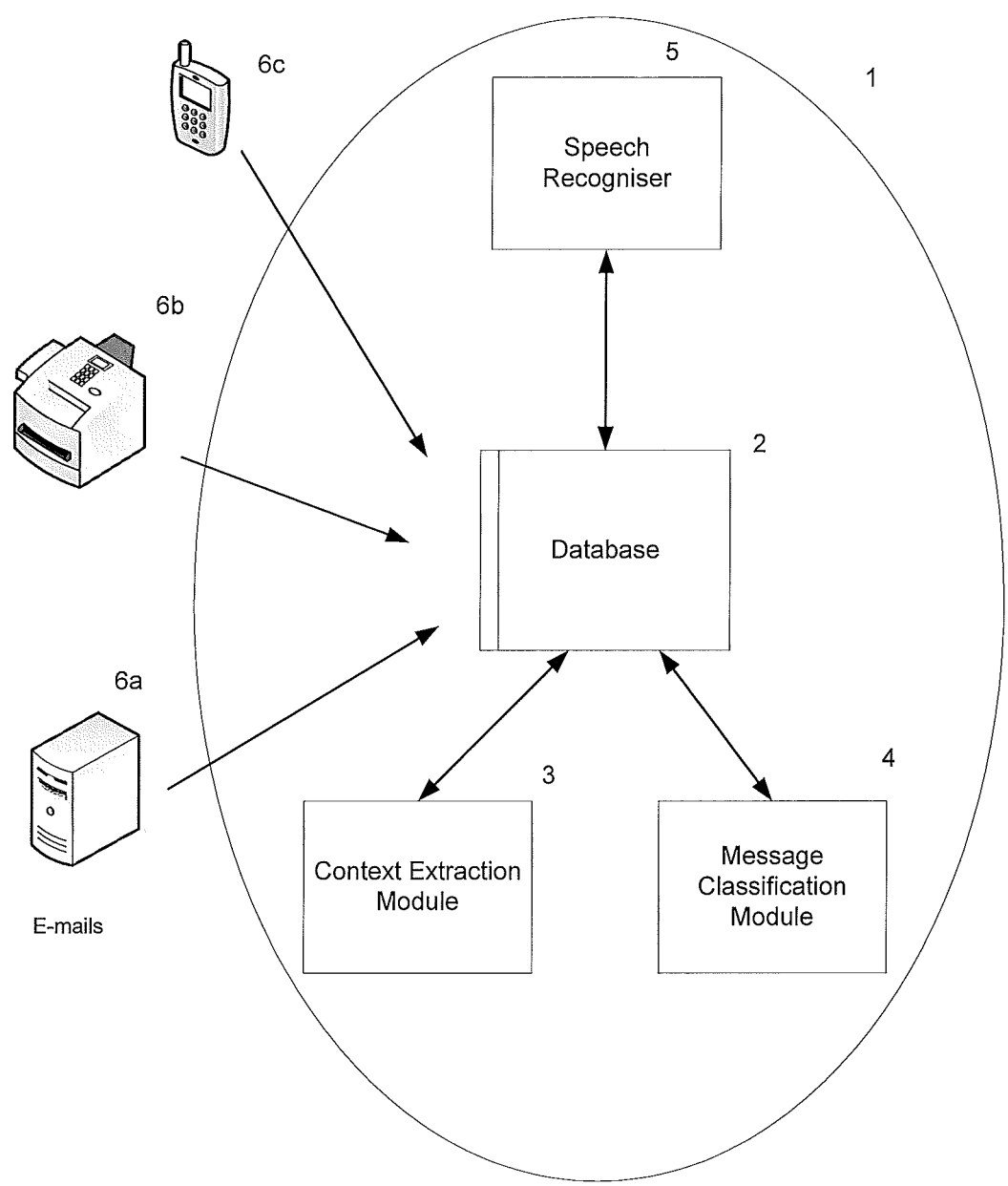
FIG. 1 illustrates a system according to an embodiment of the invention.

FIG. 1 illustrates a digital messaging system 1 according to the invention. The system 1 comprises a database 2, a context extraction module 3, a message classification module ∝and a speech recognition module 5. The system 1 is also referred to herein as the 'Threads' system.

The system 1 receives inputs from a plurality of different sources that provide digital or digitised information, including but not limited to emails from an email system 6a, scanned documents from a scanner 6b and voice messages from a telephone system 6c.

The system 1 may be implemented on any suitable computing resource, from dedicated servers to in the cloud. The context extraction, message classification and speech recognition modules are algorithms that run on one or more processors to implement the functions that will be described in detail below.

Since the widespread adoption of computers and networking in companies, businesses and organisations, the medium for the exchange of information has changed from the physical (pieces of paper) to the digital (computer files and message streams). As such, the storage medium has migrated from shared physical access in filing cabinets to mostly private digital access, namely personal email accounts. While the digital form is easier to store and search, it often ends up locked in private user files. This applies primarily to company email, but also extends to documents (e.g. invoices, quotations, etc.) that may not be confidential and are often needed to be shared amongst employees. As email has become the de-facto currency for business communication, with most documents shared as email attachments, sharing email is the key to re-establishing the collaboration ethos. While various procedures (e.g. using shared email folders) can be put into place to allow the sharing of email, none is really successful. Apart from the fact that these require strict user discipline on the handling of email, they often fall down when the user has several email accounts, or is working from remote locations. Special purpose software, such as bespoke email clients, are not popular. Gains made through digitisation are often lost through unnecessary systemic possessiveness. A culture of non-sharing often evolves and becomes the norm.

A system according to the invention is designed to obviate the need for staff to treat their mail specially. It allows staff to continue to use their preferred email services (clients and servers) and not change their working practices. It allows them to inspect and search all of their company's mail as easily, if not more easily than just their own. Since the quantity of mail being searched is a function of the number of employees, this clearly has efficiency implications.

Although email is important, there are other types of digital message that contribute to the context of any business process. This can include telephone calls, SMS "text" messages, "tweets", "Facebook notifications" and "instant" messages (eg Skype). The system 1 is able to unify various digital message types so they may be treated in the is same way.

Unification requires context. The useful information content of each message is not always obvious or available, but once the message has some context, then there is often sufficient information available to decide if it is worth reading. Where the message is not textual, the context can be crucial to understanding the semantics. For example, the phrases "A tax on merchant shipping" and "Attacks on merchant shipping" are phonetically identical in English. Searching for the word "tax" in the context of emails from a war correspondent would likely yield a different result from a business correspondent.

In a system according to an aspect of the invention, the context is a combination of the "project" or "job" to which the message is related, and the people communicating through it. The system attempts to automatically and tentatively classify messages according to the job to which it is deduced to relate. The user has the option of ignoring, accepting or rejecting the tentative classification. Messages that are accepted may then form part of a valuable knowledge resource for finding and analysing other related messages and inferring relationships between messages, companies, contacts and jobs that would have been previously unavailable in an unshared message handling system. A barrier to the adoption of any message sharing system in an organisation can be the users' perceived loss of message privacy and security. Once again, it is the context of the message that determines the threat to privacy and security, and most importantly, the message senders and recipients determine this. For example a personal message to a user's relative is unlikely to affect the security of a company, but the content could be embarrassing to the user if shared. Similarly, a message from a company's bank manager, may cause concern if shared.

To address this, the system according to embodiments of the invention includes a database of contacts. The database is used to flag which third-party contacts are dealt with and how, if at all, their mail may be shared and with whom. Users are comfortable with contact databases—most business users have address books—and once the company address book is dynamically updated according to day-to-day message traffic, as happens with the system according to aspects of the present invention, they all immediately get benefit.

If users are to be encouraged to share messages, they need to feel confident that they are not inadvertently sharing their private messages, since in most companies, employees often make personal use of their company email accounts. This is achieved primarily by looking up message senders and recipients in the database of company contacts. If a contact is in the contact database then, by default, messages exchanged with that contact are to be shared. If contacts are not in the database, then messages between the contact and the user are kept private—at least until the user declares them shareable. That is not to say all contacts in the database are shared—there are several mechanisms to make company mail confidential—but users are generally discouraged from adding personal contacts to the company contact database.

Customer Relationship Management (CRM) systems and contact databases often have shortcomings that are circumvented by the system according to aspects of the present invention. For example, contacts can work for several companies—either simultaneously or sequentially. When a contact leaves a company, the contact details cannot simply be deleted—the messages sent to and received from that contact still exist and may be relevant. Users still need to know the details of the contact even if he/she no longer works for the company. Similarly, a contact may work for several companies, or several different branches of the same company. Many Customer Relationship Management (CRM) systems deal with this by "cloning" or "aliasing" contacts, which effectively creates an additional contact with the same name. This has the disadvantage that it gives rise to the possibility that changes to one cloned contact will not be reflected in all other cloned contacts so that they effectively become unsynchronised. Another potential issue is where a single company has many branches. These are commonly handled (in other systems) by storing each branch/department in its own record. In such a scheme, it is not easy to synchronise the common attributes (for example, the company name) of all the departments. The system according to aspects of the present invention allows one legal entity to be represented as a single record and each branch as a record related to it. So that for example, if a company with branches changes its name, it is only necessary to change one record. This mechanism does not prohibit subscribers from creating multiple contacts or companies with the same name should they so wish, but it is generally preferable to create multiple channels for a single contact or company.

Speech Recognition

The fact that digital messages such as email, SMS texts, tweets, etc contain machine readable text means that searching and sorting operations on them are relatively straightforward processes. However, digitised phone calls present a significantly greater challenge, since it is the raw speech that has been digitised rather than the message content. The process of converting a digitised waveform of human speech into text is known as "Automatic Speech Recognition" or ASR. The goal of most ASR systems is to act as dictaphone and transcribe speech. Speech is a fast and natural way of communication. In this situation, there is an intrinsic need to provide recognition performance as near as possible to that of a human and systems that are unable to do this—for cost, performance, training reasons—are of limited use. In the system according to aspects of the present invention, the aim is not to transcribe speech or voice messages but to locate and categorise them. A great deal of the information available in speech is redundant and so it is possible to use speech recognition algorithms that might be otherwise unusable as a speech dictaphone. For example, when attempting to locate a particular call, it is unlikely the user would search for common words such as "the", "but", "going"—as would also be the case when searching text based messages. Common words are, by definition, frequent, so finding them has little information value. By only needing to search for speech containing uncommon words—denoted keywords—the system according to aspects of the present invention is able to gain benefit from ASR algorithms that would otherwise be unsuitable as a speech dictaphone. This is because:

1. Keywords are mostly acoustically and syntactically more complex than common words and so speech recognition algorithms make a better job of recognising them, from a wider selection of speakers.

2. Keywords are more likely to occur in related threads of text. For example, if two contacts exchange emails in addition to telephone calls, it is highly likely that those emails will contain the keywords present in the telephone conversation. The identification of keywords in speech is generally much better when the vocabulary is small and specific. In other words, where an email message and a telephone conversation are related by the same context, speech recognition can be performed by checking against keywords extracted from the email.

3. There is no requirement to perform the speech recognition in real time since the keyword identification will only be required when searching takes place—typically days or weeks after the message has been exchanged. This allows keyword extraction to take place when computing resource is cheap and/or plentiful.

4. There is no requirement to use only knowledge gained prior to the conversation. Even text messages received after a voice message may contribute to the accuracy of the keyword identification so that any search for keywords can be made on the best data available at the time.

5. A voice message commonly contains useful metadata including the identity of the individual speakers or at least to which group of speakers they belong. Where this is not available directly from the call, users may be rewarded for identifying speakers after each call by subsequent better performance.

2.0 General Operation

Various aspects which contribute to the system according to the invention will now be described.

2.1 Symmetrically Searchable Relational Database

The database 2 is, for example, a symmetrically searchable database hosted on behalf of the subscriber on a dedicated device, on a general-purpose computer or a so-called "cloud" computer of unknown location. A database schema automatically relates 4 tables—messages, contacts, companies and jobs—such that searches and selections on any one table will result in an automatic selection of the other related tables. The schema may be implemented using any relational database framework.

Databases of this general type are often known as Customer Relationship Management (CRM) systems. The system is not generally described as a CRM system because it is limited to certain very specific contact management functions and the amount of information stored about each contact is limited to that necessary for searching and sorting their communications. However, its functionality could be extended to offer full CRM services.

In the context of the system 1, 'companies' are (legal) entities representing arbitrary groupings of people (or contact entities) that share some interest. The following are example companies: "The Royal Society"; "Surbiton High School"; "The Waggon and Horses Pub".

Contacts are generally people, some who work for the company using the system 1 and some who work for the other companies they deal with—customers, suppliers, etc. Contact entities may be one individual or a group of individuals sharing the contact name, for example "Sales", "Information".

The company that uses the system 1 is called the subscriber, and the people that are authorised to use the system 1 are called the users. Normally, but not necessarily, the users work for the subscriber. Companies can, in certain circumstances, be treated as contacts, for example where an individual contact is not identifiable.

Messages are digital communications between two or more contacts. They are characterised by some message content and some addressing information identifying the contacts sharing the content.

Jobs are arbitrarily defined tasks, projects or some other operation. Jobs are characterised by a job description.

Companies, contacts and messages are related by means of intermediate tables whose entries are called channels (see 2.2 and 2.3). Jobs are directly related to messages, companies, contacts and messages.

The relationships between each main table (i.e. companies, contacts, messages and jobs) is such that a search on one table will always result in an implicit search on related items in the other tables. In this sense, searches are symmetrical. For example, a search for a message containing the word "Christmas" will show all contacts that participated in those messages, the companies they work for, and the associated jobs.

This approach contrasts with typical CRM systems which often do not automatically invoke relationships between tables—ie the user may be required to create a complex search query to achieve a similar intuitively simple result. The system 1 gives priority to ease of use over search efficiency and attempts to mitigate performance penalties by using the best available search algorithms.

The subscriber initialises the database 2 with the following datasets:

1. Information about the subscriber, such as company details and billing information.
2. Names of contacts which are authorised by the subscriber as users of the system according to aspects of the present invention.
3. Names of contacts with whom the users exchanges messages.
4. Names of companies that contacts work for or represent.
5. Jobs or projects in which the users are involved.
6. Details of sources of historic messages—eg mail accounts, phone systems, etc.
7. Details of sources of future messages—eg mail accounts, phone systems, etc.

Each main dataset (contacts, companies, messages and jobs) is termed a table.

Initialisation data can be entered manually, via a web interface, or uploaded from a subscriber file (eg a file with Comma Separated Values).

Once the system is activated and initialised, it ingests new messages by polling the designated message sources on a regular basis—typically once per minute. Contact, company and job details may be added either manually by means of a web application or by a file upload or automatically via various rules or an Application Program Interface (API).

Contact and company information may be optionally synchronised with a company-wide directory using the Lightweight Directory Access Protocol (LDAP). If this option is enabled then contact address information is accessible immediately from email clients and telephone systems that support this protocol—which is most of them.

From each message ingested, the system attempts to extract those words that carry the most information content. These are denoted keywords.

Messages in the form of speech are converted into text by a process of Automatic Speech Recognition (ASR). Where information about the speaker (for example their identity as established by their telephone number or voice pattern) or the likely context of their discussion (eg. a previous message) is available, then this is used to optimise the ASR recognition performance. While the system will attempt to recognise all words uttered, it will primarily attempt to extract keywords.

Users may search any table or combination of tables but for any search, the relationship between tables is automatically applied. For example, searching for all messages containing the word "Christmas" will automatically list all the contacts, companies and jobs involved in those messages.

The search may take the form a sequence of search terms and equivalence relations which are logically "anded". In principle, the relations may apply to any field in any table. In practice, they are restricted to common search terms with the option of an "advanced search" for more complex situations.

Additionally, messages may be "filtered" to include only those messages senders or recipients that are:

1. Known contacts
2. Possibly known contacts (have email addresses with a known, non-generic domain)
3. Unknown contacts (also called Orphans)
4. Contacts that have become inactive (eg left the company they worked for).

As such, searches can implicitly exclude unsolicited messages (such as SPAM) which are retained until either those contacts become known, or some time limit expires (say one year).

If the subscriber chooses to include job information, then the system will attempt to associate each message ingested with one or more jobs.

Each job contains various parameters which it can associate with messages to varying degrees of certainty. However, except in the case of Reference (2.13) or Regex (2.14) associations which are deemed as confirmed, any other association is deemed to be tentative until a user confirms the association. At this point, the new message contributes to the statistics of the system, the job, the company and the contact.

Where the address of a message contact is ambiguous, for example a phone call from a withheld or switchboard number, the user may make a manual association as soon as the message appears in the system database. In the more likely case of a switchboard number, the user is offered the choice of existing contacts or adding a new contact.

Similarly, for unknown, generic or ambiguous email addresses, the user is offered the choice of identifying an existing contact or creating a new contact. If users adopt the discipline of identifying unknown or ambiguous contacts regularly, then the system contact database provides a dynamic reflection of the subscriber's contacts.

Users may perform simple personalised mail merges using contacts from the system contact table. The benefit of this facility is that:

a. Mailshots may be executed much more quickly than using a dedicated mail management application (web or workstation)

b. By generating a plaintext message body (ie no HTML), each mail is far less likely to be mis-identified as SPAM 2.2 Channels: A Schema for Relating Companies to Contacts and Contacts and Companies to Messages.

In order to communicate with and identify a contact, it is necessary for the system to hold a communication address for the contact. This could be a postal address, a telephone number, a Twitter address, an email address, etc.

Figures 2, 3:
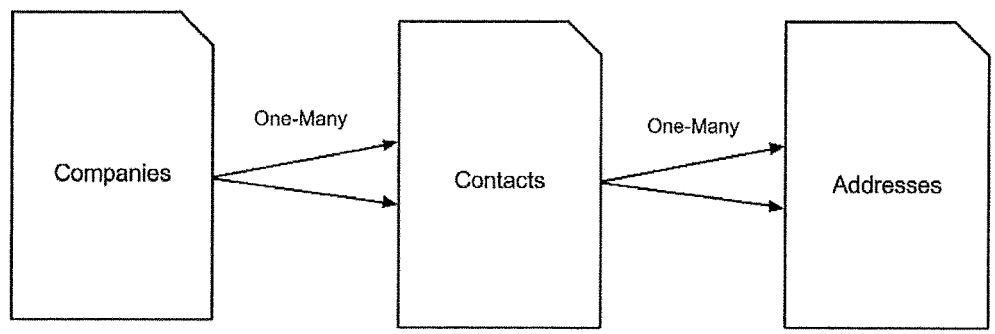
FIG. 2 shows an overview of the system interface.
FIG. 3 illustrates a conventional schema showing the relationship between companies, contacts and addresses.

In (traditional) hierarchical schemas, contacts work for companies, and contacts have various addresses. In short, there is a direct relationship between companies and contacts and contacts and addresses, as shown in FIG. 3.

In contrast, the system 1 adopts a schema in which companies are indirectly related to contacts by means of intermediate tables called channel tables, or simply channels. These channels effectively define how to communicate with the contact representing the company. They recognise that although a person is a single physical entity, that person can wear many "hats". For example working for several different companies, leaving one company and joining another, or not working for a company at all. By the use of channels it becomes unnecessary to duplicate contacts.

Figure 4:
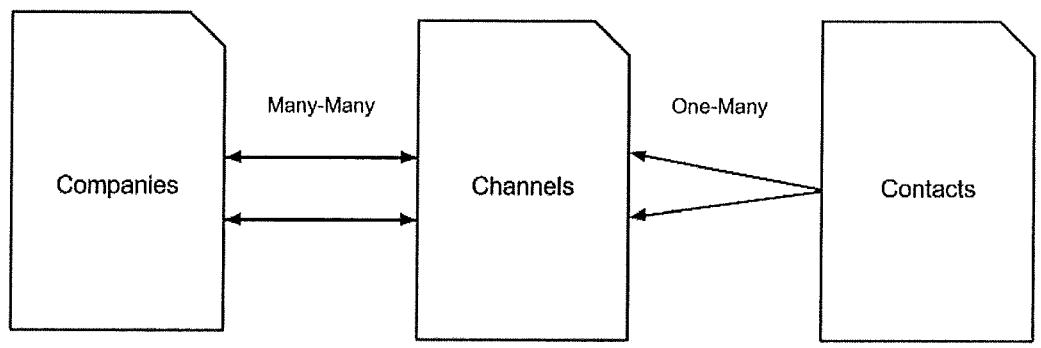
FIG. 4 illustrates a generalised summary of the way companies and contacts are related in the schema of the system according to embodiments of the invention.

FIG. 4 is a generalised summary of the way companies and contacts are related in the schema of the system according to embodiments of the invention.

Channels can play a similar role in relating messages to contacts, and messages to companies. They also allow for the contingency where the contact is unknown or simply does not exist. Last but not least, channels can be used "in series" to convey more complex relationships.

A channel path may comprise records from companies, contacts and messages connected via one or more channel records. There are 3 types of channel record:
1. The generic channel (The channel)
2. The message channel
3. The company address The purpose of the message channel and company address is to abstract information from the generic channel so that the generic channel can be treated identically for searching processes.

2.2.1 The (Generic) Channel

Figure 5:
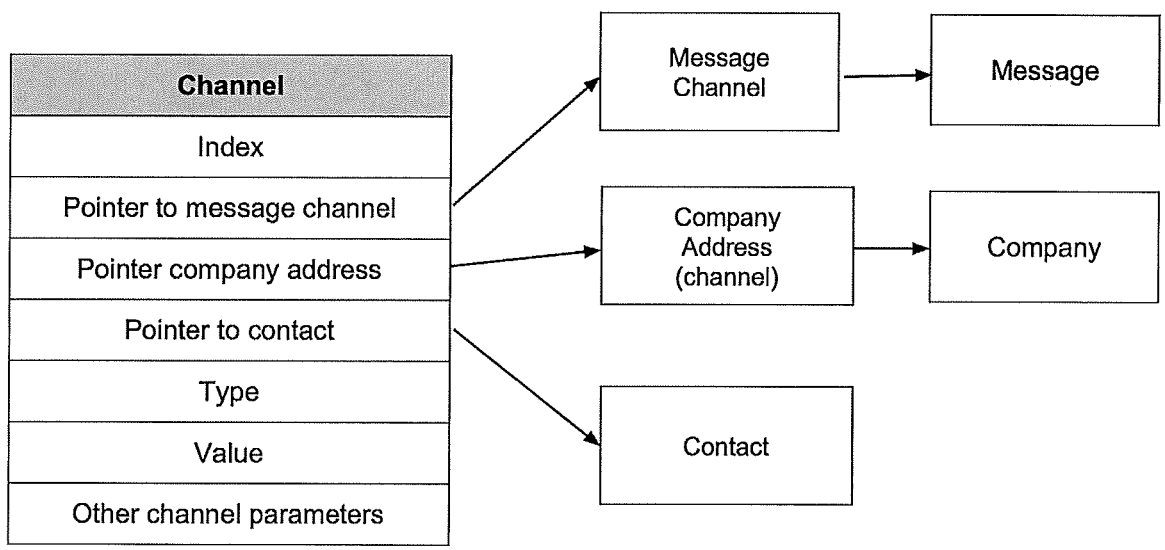
FIG. 5 illustrates the generic channel schema of the system according to embodiments of the invention.

The generic channel schema is summarised in FIG. 5.

The (generic) channel comprises pointers to the Message channel, the Company Address (which is also a channel) and the Contact record.

The (generic) channel contains fields which describe its type, such as
Telephone number
Email address
Pager number
Twitter address
and its value, such as:
fred@acmescrew.com
07715-207111

Other channel parameters include special attributes which are described in 2.7.

As an example, suppose Fred Smith works for Acme Tools at their Brentford office but in his spare time runs a band called "The Sandal and Socks Brigade". You can phone him at work or email him at the band.

The contact is "Fred Smith"

There are 2 channels: 1 channel of type "email" with value "fred@ssband" and one channel of type "phone" with the value "012345-67899".

One channel points to the company address of "Brentford" and one the "default" address of the band, in the local working mens' club.

2.2.2 The Message Channel

The message channel record is used to identify the function of the channel. For example, in an email to describe whether the address is "to", "from" or "cc.

2.2.3 The Company Address

The company address record is used to associate a company with a location, division, department or some other sub-set of a company.

2.2.4 Company-Contact Path

Figure 6:
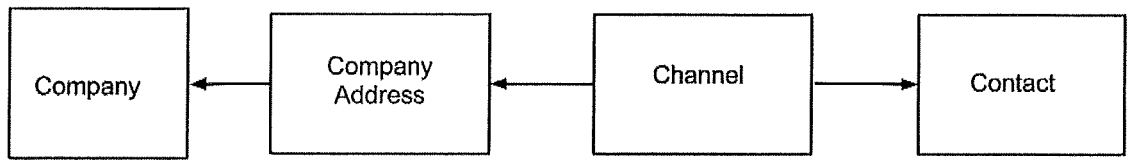
FIG. 6 illustrates the company-contact path.

This path is established after the contact is created and a channel to a given company is added, as shown in FIG. 6.

2.2.5 Message-Contact Path

Figure 7:
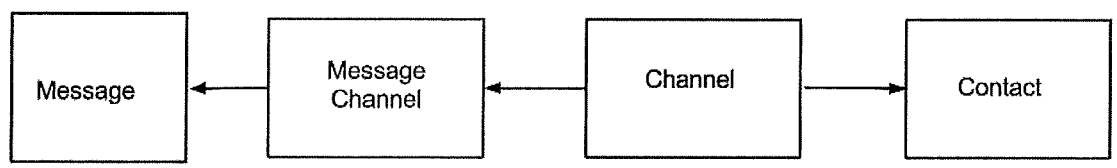
FIG. 7 illustrates the message-contact path.

This path is shown in FIG. 7. When a message is processed, if the channel exists then 3o the contact and company can be inferred. If the channel does not exist, then a contact will be created and termed an orphan. Unless the contact name can be inferred from the address (for example john.smith@acme.com), a placeholder name will be used. There will be no channel connecting the contact to a company although this may be created retrospectively (see 2.11 "click association")

The company-contact path and the message-contact paths are analogous. The company address and message channel perform similar functions, each provides one of many paths in the company/message and abstract the pure addressing information to the channel. While technically the company address could be described as the value of a channel of type "postal", this is not its function. Its purpose is simply to identify a subset of the company. Similarly, the function of the message channel is identify a subset (or person) of the set of all people party to message.

If there were a "postal" channel type, then the channel address field might be concatenated with the company address.

Figure 8:
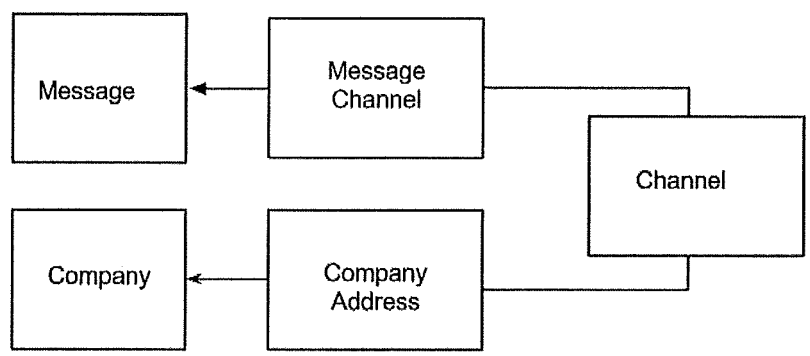
FIG. 8 illustrates the message-company path.

For example:
Company: Young's Breweries
Company address: Riverside House, 26 Osiers Road, Wandsworth, London SW18 1NH
Channel address: Room 169
Contact: Arthur Young 2.2.6 Message Company Path This path is shown in FIG. 8. Some channel addresses do not relate to individual contacts, for example generic email addresses such as "info@acme.com" or switchboard telephone numbers.

In these circumstances, the channel relates the message channel to the company address.

2.3 Contact Normalisation

Often a single contact may represent (or work for) several companies or perhaps several divisions of one company. While the majority of contacts work for just one company at a time, most contacts change companies at some point in their careers. When they move companies, their previous messages do not relate to their new employer so their contact records cannot be simply reassigned.

In the system according to aspects of the invention, the channel schema allows any given contact to have an arbitrary number of channels to an arbitrary number of companies (or more specifically, company addresses), so that the need to represent a single person with more than one contact record is obviated.

Figure 9:
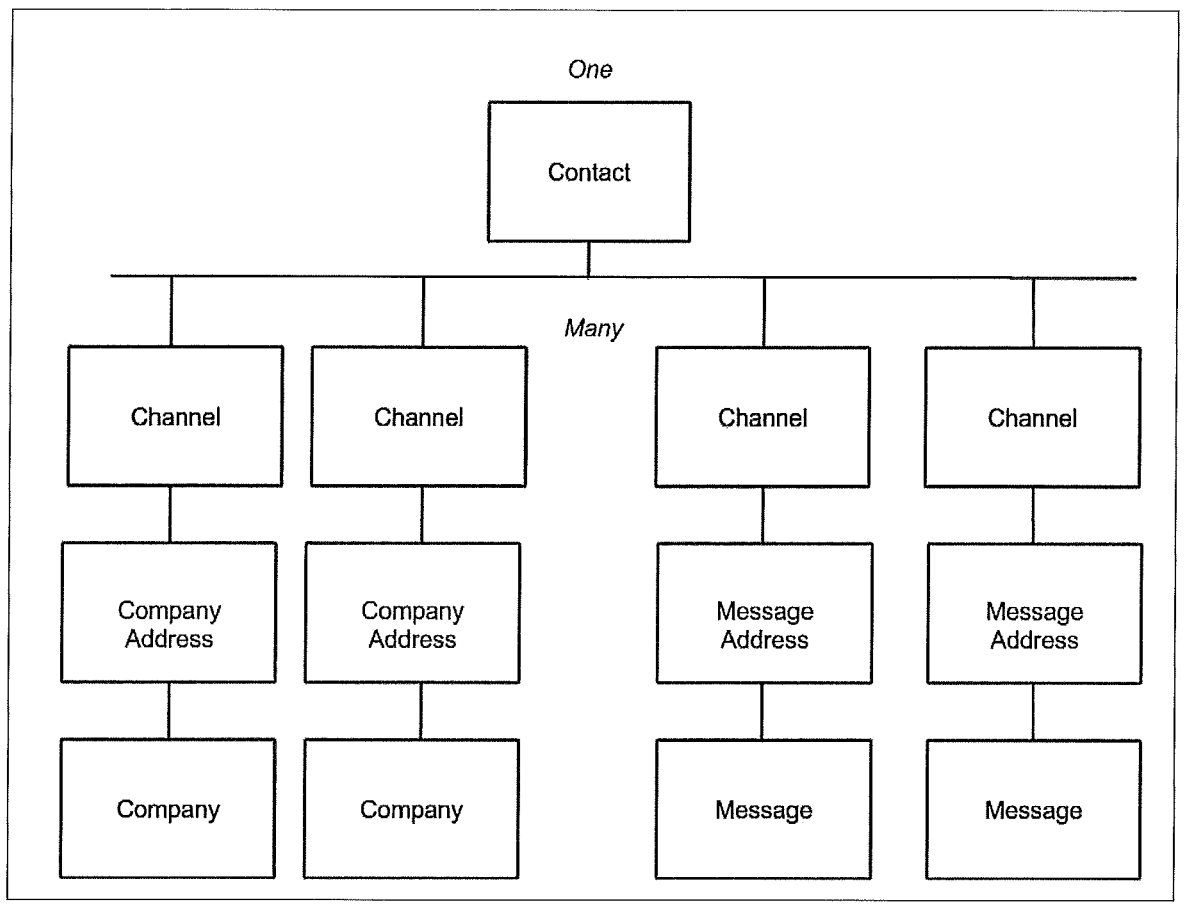
FIG. 9 illustrates the concept of contact normalisation.

The major benefit of only storing one contact record per actual person is that 1. the opportunity for mis-synchronising multiple contacts is obviated
2. only a single record needs be changed if some intrinsic characteristic of the contact is changed—eg their name
3. channels that are unaffected remain in place FIG. 9 illustrates the concept of contact normalisation.

Although contact normalisation is desirable in the interests of not duplicating information, it is not essential. The system schema permits the same contact to be represented by several records if so desired. Indeed, this situation often arises when inheriting legacy schemas.

2.4 Company Normalisation

Just as it is desirable not to duplicate contact information, it is equally desirable not to duplicate company information. As discussed earlier, where a single legal entity has many distinct divisions, the system provides for a company contact relationship which includes the division, termed the company-address.

As with contact normalisation, although company normalisation is seen as desirable it is not a necessity. The system schema permits the same company to be represented by several records if so desired. Again, this situation often arises when inheriting legacy schemas.

Figure 10:
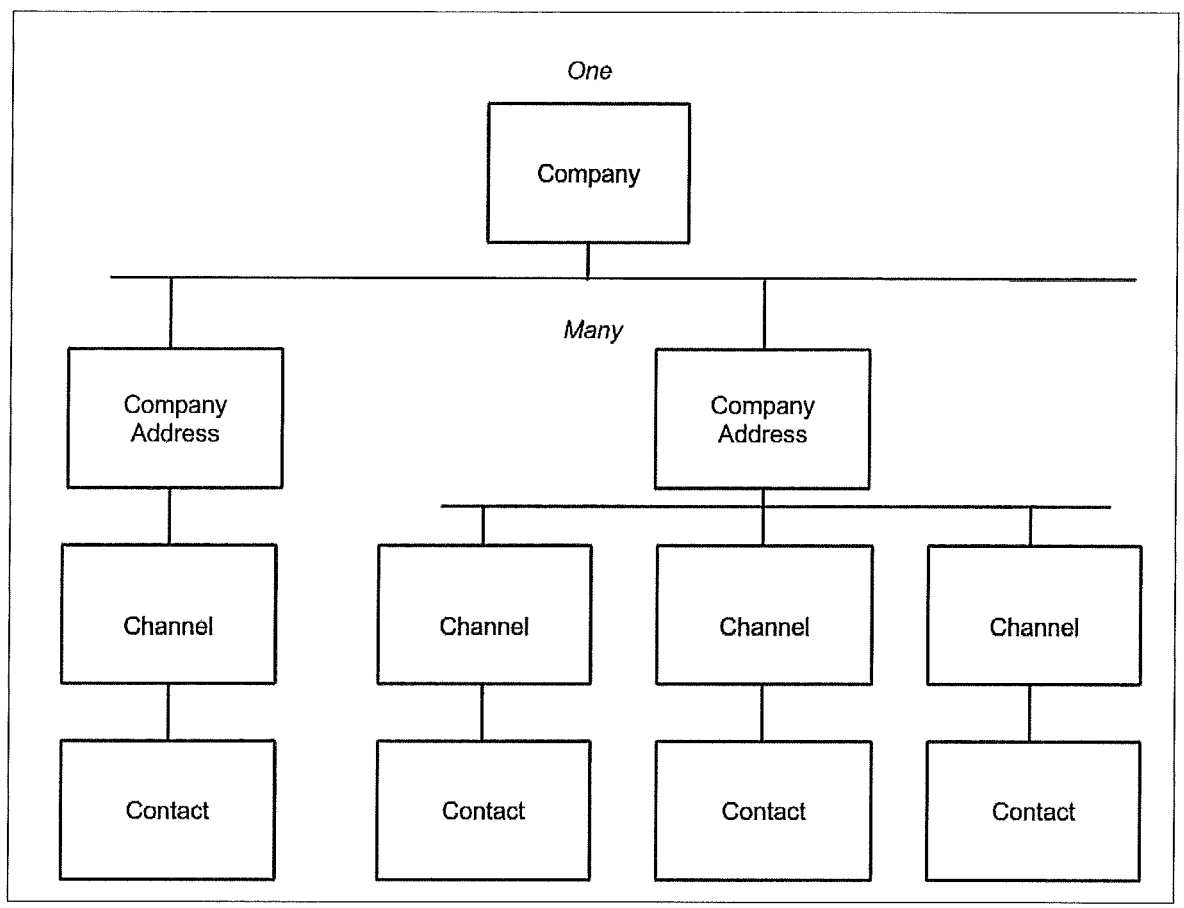
FIG. 10 illustrates the concept of company normalisation.

FIG. 10 illustrates the concept of company normalisation.

2.5 Message Abstraction

Message is the term used for the content of any general communication. In the case of an email it starts as some text sent from one person to one or more other persons. If, as is commonly the case, the recipient responds and includes the body of the original message in the reply, then the subsequent emails develop into a conversation. In this sense, it is little different to a spoken conversation.

Internet standards (Internet Engineering Task Force RFC memoranda 2046, 2047, 4288, 4289 and 2049) govern the detailed format of an email message and cover structures such as addresses, timestamps, attachments, etc. For the purposes of system according to aspects of the present invention, we are only interested that an email comprises a list of email addresses (including the sender and recipients) and the message itself (that may contain attachments).

```
From: "david.johnson@fookes.com" <david.johnson@fookes.com>
To: "'J=?UTF-8?Q?=c3=a9r=c3=b4me=20Ar=c3=a7?=ois'"
<jerome.arcois@fookes.com>
cc: "'Joan Miller'" <joan.miller@fookes.com>
cc: "'Susan Williams'" <susan.williams@fookes.com>
cc: "Peter Smith'" <peter.smith@fookes.com>
cc: "'Eugene Fookes'" <eugene.fookes@outlook.com>
Importance: High
X-Mozilla-Status: 0001
Subject: Please=?UTF-
8?Q?=20check=20important=20charts=20from=20Snj=c3=b3fr=c3=ad=c3=bo?=ur
MIME-Version: 1.0
Message-ID:
<!&!AAAAAAAAAYAAAAAAAAABluo5KJeUpCslhvgKM4mZnCgAAAEAAAAIGHdE
3Z8MdFhGLsK9UnDgUBAAAAAA==@fookes.com>
Date: Tue, 25 Feb 2014 10:58:18 +0100
Content-Type: multipart/mixed;boundary="Next_Item:_(A3CB49KFSA19)/1"
```

From the email addresses, the system 1 can deduce the names of the contacts by looking up the contacts related to the channel value (i.e. email address).

Telephone conversations can be processed if they are available in a digitised form that can be read by computer. Since digital is now the standard implementation for telephony, it represents a major source of communication data.

In a Voice over IP (VoIP) phone system it is possible to trace each call either from a database maintained by the Private Branch eXchange (PBX) or, more generally, from "sniffing" the relevant packets on the subscriber's LAN. A phone call can be treated much like an email except that the channel type will be different—i.e. it will be "phone call" instead of "email"—and the value will be a phone number rather than an email address. In general, there will only ever be one sender (or caller) and one recipient (or person called). In the case where a call is transferred from one employee to another, then this can be treated as having multiple recipients, but relatively simple processing of metadata will reveal whether one or more of the "recipients" was involved in the main dialogue.

The "body" of a phone call is a digitised recording of a conversation, whereas the body of an email is a text string. Aside from these differences, a phone call may be treated almost identically to an email. The addressing does of course differ. An email address has a different syntax to a telephone number, but aside from this they have similar attributes.

A mobile telephone or direct-dial (DDI) number is generally associated with an individual contact, just as is an email address. Calls to and from a company switchboard, however, would not necessarily yield a unique contact—except in the case of a company with one contact. Nevertheless, the same can and often does apply to email addresses. Many companies use group user names to protect the identity of individuals, or where the individual identity is unimportant. (e.g. claims@acmeinsurance.com or info@widget.com). In these circumstances, the system according to aspects of the present invention relates the message to the company channel rather than to the contact channel and this is one very important reason for extending channels to companies.

Some information is better than no information and the missing identity can often be easily established later.

Even though a contact is not uniquely identifiable from its channel value (i.e. email address or phone number), it may be quite obvious to the user who was involved in the message. In the absence of any definitive address, the system allows the user to easily tag the third-party contact after inspecting the message (i.e. listening to the call or reading the email). Possible "orphan" contacts can be "adopted" in a few clicks. Typically when a call from a switchboard number is terminated and the message appears in the system, the user can associate the specific person from a short list of employees—or optionally add a new contact and/or company.

By making this process very simple, users soon willingly adopt the discipline of identifying contacts wherever they can. Of course, they don't have to, but the benefit of so doing is that locating a message to or from a specific person is normally easier than locating a particular one to or from a specific company.

The "subject" of the phone call can be also used to add helpful information such as the transfer path.

As we have seen, emails and phone calls have sufficient similarity in structure to allow them to adopt very similar data schemas. Notwithstanding that, if the content of the phone message is not available as searchable text, many calls can be quickly identified from the user names, the contact or company and most importantly, the time of the calls. Simply searching for a list of all messages passed between the system subscribing company and a given third-party company quickly reveals meaningful information.

2.6 Ingestion

Ingestion is the process by which the system 1 collects messages for processing. The system distinguishes between ingestion of historic messages, ie historic message ingestion, ie messages whose transmission date is earlier than some fixed period from the ingestion time—typically the polling period—and messages dated since the last polling period, which we call current message ingestion.

Given that there is a limit on computer resources available to each subscribing company and the fact that there may be a large volume of historic messages for new subscribers, the system treats current and historic ingestion differently.

Processing priority may be given to current messages. When all current messages have been ingested and there are resources available, then historic messages are ingested in reverse order of date. Thus, the most recent historic messages get ingested first and will continue to be ingested until current messages come in. Alternatively, the processing of current and historic messages may be scheduled to occur according to pre-defined rules such as some ratio of current/historic messages.

In the case of email ingestion, email can be collected by a mail server that is created specifically for the subscriber that hosts a mailbox or mailboxes on behalf of the subscriber. The subscriber deposits email here for processing. This is termed pushing because it is the subscriber's responsibility to put (or push) the email to the system for processing. The mechanism by which this occurs might be a rule on the subscriber's mail server, a rule on a user's mail server or a user-instigated operation such as dragging or copying specific emails to the system mailbox.

Alternatively, the subscriber provides authentication details (ie login information) to the system nominated mailbox hosted by the subscriber's nominated email server such that the system may periodically collect emails for processing. This process is termed pulling.

An email user commonly sends and receives mail by means of a special application called an email client. There are many email client applications available which may vary according to the environment in which they run—for example the host operating system such as Windows Mac OS, IoS, Unix, etc—and the facilities they provide. In order to ensure compatibility between various clients and servers, a system of standard protocols exist. These are mainly IMAP and POP for receiving email and SMTP for sending mail. The more modern IMAP protocol differs from POP in that the email generally stays resident on the server whereas POP servers generally deliver the email to the client for reading. Since IMAP mail servers tend to store historic mail, the protocol provides for a system of folders for managing the storage of email. Users often name folders to make the finding of historic email easier. Within broad limits, folders may be named as the user chooses.

FIG. 11 illustrates an example of an IMAP folder organisation.

Where the ingestion source—both pushed and pulled—is a hierarchy of mailbox folders rather than a single mailbox, the system can infer the context of the message from the name of the folder from which the message is extracted. This may be used to associate messages with jobs, (described later in this document).

Messages other than emails, such as phone calls, SMS messages etc, which are not formatted in the same way as emails, are first converted into a data schema which maps to that of an email and then ingested into the. Each message is tagged with its source and destination addresses and various other metadata such as subject, date and time of transmission, time zone of sender, etc.

2.7 Channel Attribution

The abstraction of channels from the contact permits each contact channel to have different attributes. For example, suppose a contact called Jane Smith may be both a friend and client. The personal email address (channel) could be designated as private whereas the work email address could be marked as shareable.

The system 1 currently supports 4 attributes:

2.7.1 Hide from Directory

This attribute provides the choice of synchronising the channel with an external LDAP directory. It would be commonly used to prevent confidential or irrelevant channel addresses from being shared.

2.7.2 Hide Messages

While enabled, this attribute may either a) causes any message received which includes this channel address to be hidden from all users or b) causes any message received that includes exclusively hidden channel to be hidden from all users. Messages previously hidden can be exposed at a later date. This attribute might be invoked temporarily suppress the sharing of sensitive messages.

A further option is to hide from all users except the sending or receiving system user.

2.7.3 Exclude Messages

This attribute prevents any message that contains this channel from being ingested. If at a later date, it is decided to share the message, it would need to be re-ingested.

2.7.4 Is Active

This attribute makes the channel active so that, subject to the other attributes and to familiarity classification rules (2.8) messages containing this channel are shared. This would typically be turned off when a channel was no longer used by a contact—for example when moving to another company with a new channel address. Channels are not normally deleted because if there are messages exchanged using the channel address, the contact details would be lost.

2.8 Familiarity Classification

Messages can, and often do, come from addresses not contained in company or contact channel tables. Since there will be no related company, the system creates "unrelated" contact records and culls as much information as it can from the email address. For example, it is often possible to parse the user name and infer the name of the contact e.g. fred.smith@acme.com.

The system designates these contact records "orphans"— since they have no parent company—or in the parlance of the user interface, "Contacts I don't know".

If the domain (e.g. jpy.com) of the sender or recipient's email address matches an existing company domain, then these contacts are termed "Contacts I might know". For the purposes of matching domains, company domains cannot be generic (see 2.18).

Contact with channels that point to known companies that have been confirmed by the user (either manually or by a data upload) are designated "Contacts I know". Contacts with channels that do not have the "Is active" attribute set, are "Inactive contacts". These attributes are collectively called familiarity attributes, as shown in FIG. 12.

Any search may be filtered using any combination of the familiarity attributes.

For "Contacts I know", "Contacts I might know" and "Contacts I don't know", the search filter will include any message that has an addressee with the attribute ticked. Some of these messages might also contain addressees that do not meet the ticked attributes.

For "Inactive contacts" the behaviour is slightly different. When the "Inactive contacts" attribute is not ticked, no inactive contacts will be shown, even if the message itself does meet one of the ticked attribute criteria and is therefore shown.

The rationale here is that the "Inactive contacts" attribute is intended only for forensic investigation of messages. If inactive contacts appeared routinely, it would clutter up the list and confuse the user.

2.9 Orphan Message Caching

The major significance of orphan messages is that when incoming, they are generally unsolicited and may be SPAM. Messages are notoriously difficult to identify as SPAM—as it is to large extent in the eye of the beholder—and even expensive services often misclassify useful messages in this way.

The approach of the system according to aspects of the invention of classifying messages as from "Contacts I don't know" has several benefits:

1. The "Contacts I don't know classification can be disabled most of the time and allow users to instantly see messages likely to be most relevant.

2. The "Contacts I don't know" classification can be enabled on its own to quickly review messages for deletion or for contact addresses to be added in as known.

3. If contact addresses are added, then all the historic messages containing those contacts are reclassified.

Of course, the storage of irrelevant messages can be costly so the best strategy is to retain or cache unsolicited message for a finite period of time—up to some limit of storage. If, for example, the period is 6 months, then whenever a contact is added, any historic message less than 6 months old would be reclassified.

2.10 Orphan Message Privatisation

Messages containing orphans (or more correctly orphan channels) are marked as such and if the other senders or recipients are orphans, then the mail is only visible to the system user that sent, or user(s) that received, the message.

The rationale behind this is that if a user exchanges a message with an unknown contact, the message will not be shared with any other user, unless explicitly included on the address list. This feature is designed to gain confidence and trust from users.

2.11 Click Identification

In situations where ambiguous message channels exist, for example calls to or from switchboard numbers, or emails to or from shared email addresses, the name of the individual contact may be obvious to the user.

Click association is the process of identify a short list of possible candidate contacts allowing the user to identify the contact in a single click operation. For example if 5 contacts are known to work for a given company and a phone call is received from the company's switchboard number, then once the phone call is complete and entered into the system message list, the user may click on the contact channel and be offered the names of the 5 contacts as well as the option to add a new contact. This can be achieved in a single click with a contextual menu.

2.12-2.17 Overview—Messages and Job Relationships

There are six ways in which a message may be associated with a job, which are summarised in the table below and ranked in order of their strength of association. Further explanation is set out in paragraphs 2.12 to 2.17 below.

| Type | Strength | Description |
|---|---|---|
| Manual (2.12) | 1 | Manually confirmed or denied. This is where a user manually selects an email and selects a job and associates or disassociates the two. |
| Reference (2.13) | 2 | By Job Internal reference (eg 0014FB.D0F) found in subject |
| Reply | 3 | A reply to a message already associated with a job |
| Reg-ex (2.14) | 4 | By reg-ex set text set in the config files for each company (2 allowed by company, for example to pick up (eg) 957.006589 for support jobs, and also (eg) Enquiry Ref: 9154 for enquiries). These as well as associating an email with a job will also automatically create a job with the same name. |
| Tag (2.15) | 5 | By Job tag. This is a comma separated list of text which is searched for both in the subject and (by config preference) also the body of an email |
| Keyword (2.16 and 2.17) | 6 | By Keyword. Keywords are determined dynamically from existing emails already associated with the job (only where the status of the association is confirmed at present). These keywords are used to determine if the incoming email should be associated with the job, but this is only calculated on the fly and no record is kept in the database of this association. It is used to present to the user a list of 'candidate' jobs for which they may or may not decide to confirm an association. |

When a message is ingested, if possible, it will be associated with a job by Reference, Reg-ex or Tag (in that order). If this is successful, then a relation is created between the message and job. Once a job is located, the search ceases, so on ingestion only one association between a job and a message is created, even though a message may be associated with many jobs through the system interface. This is to speed up message ingestion and prevent unnecessary processing.

Subsequently, when a user views messages in the message tab view, he/she will see in the "job" column, the name of the first related job. If there is more than one related job, then the job name will be appended by a number denoting the additional job relations.

E.g.

Refurbishment (+3)<<

When the message is expanded (using for example the chevron), the user will see a list of all message-job relations. Additionally, the system will add, say not more than 4 of the highest scoring keyword matches. The score will be based upon the statistical probability that the keywords exist in a message manually confirmed as belonging to the job.

There will be some indicator—eg icon or colour—that denotes how the relationship was established. For example:

green=manual
blue=reference
etc
Refurbishment {displayed in green}
Car Park {displayed in blue}
Purchase orders {displayed in red}

Keyword matching will only be performed on jobs not already listed as having another type of association. Rather, the list of jobs will be unique, so if a job might be listed through job reference, job tag and keyword, it would only be listed once with its highest job type as listed above.

Figures 13A, 13B:
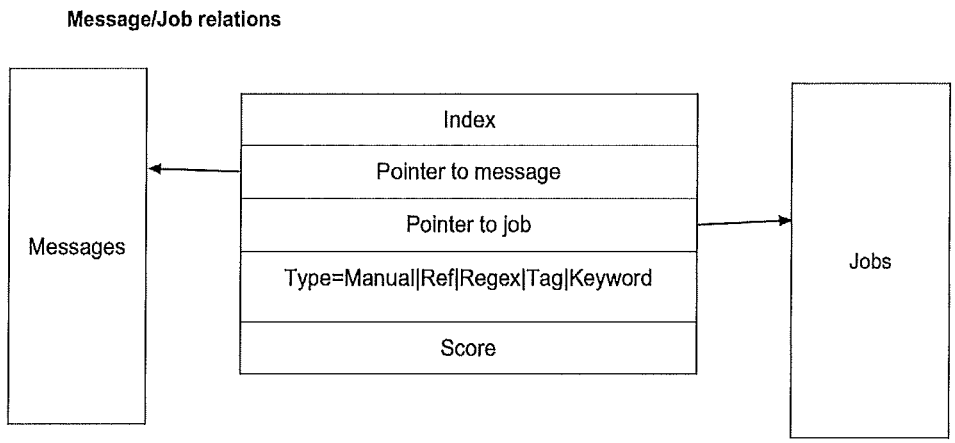
FIG. 13A illustrates message/job relations.
FIG. 13B illustrates the creation of a job internal reference.

When hovering over each job name in the expanded job list, the user will get a choice of 2 options:

Confirm, which will set the relation type to "manual"
Deny, which will delete the message/job association in the database Alternatively, a hierarchical menu may be provided to select a given job from the existing job list or even create a new job, for example:

Confirm
Deny
Job→Job 1
Job 2
Job 3→Subjob 3*a*
Job 4
Add new job The data structure for each unique message job is shown in FIG. 13A.

2.12 Manual Job Association

This is the trivial case process of manually associating a message with a job. In terms of automatic statistical allocation, it is only messages that are manually associated with a job that are analysed. This is because any error or artifact in the automatic process can skew the statistics for the job such that the process "learns" to misclassify future messages.

Until messages are manually associated with a job, the association is said to be tentative.

It is possible for the system to produce a list of messages tentatively associated with a specific job so that messages can be quickly reviewed and manually associated if valid.

2.13 Reference

Whenever a job is created, a job token (Job Internal Reference) string is created by the system at the same time. This is illustrated in FIG. 13B. The syntax of the job token includes an alphanumeric string of 6 digits followed by a period and sumcheck of 3 alphanumeric digits. If this string is used within any message, then it can reasonably safely be assumed, it did not happen by chance. The statistical probability of the sumcheck appearing in any random string of 10 characters is approximately 1:10,000,000,000.

Messages containing tokens are designated as having being token associated with a job.

Tokens are produced by numbering jobs sequentially from "000001" and deriving a sum check which is a function of the subscriber number. This allows system subscribers to exchange messages containing tokens with a reasonable degree of confidence that tokens will not have the same value.

2.14 Regex Job Association

Job Regex association provides a mechanism to both create a job and associate a message or simply associate the message if the job already exists.

Regex is an abbreviation for "Regular Expression", a formal logical statement concerning operations on the message.

Since Regular Expressions are not user-friendly and more importantly, automatically create jobs, their use is reserved for users with appropriate privilege.

An example of a typical Regex job association would be for collecting and disseminating newsletters. Alternatively where a company has a sophisticated booking mechanism a regex could be developed to detect the use of their booking reference in an email, automatically creating a job and associating this message and subsequent messages with the new job.

Obviously this would only work where the booking reference was of a sufficiently sophisticated nature that could be considered unique as with the system job internal reference above.

2.15 Tag Job Association

Users may add "tag" strings to job records. Whenever a message that contains a tag string in the subject is ingested, the message will be automatically associated with the job.

2.16 Message-Job Association

The objective of this process is to measure the fit between a test message and a set of seed messages previously associated with a given job. Seed messages are associated with a given job either manually (2.12)—ie by a human inspecting the message content and deciding if it belongs to a given job—or by reference (2.13)—ie finding the existence of some string known, to a high degree of certainty, to be associated with a job.

In the context of a message, a word is defined as:

word:=any string of 2 or more characters between two terminators terminator:=<space>|<tab>|<linefeed>|<return>

A frequency list is defined as a list of words and their probability of occurrence within a given corpus.

Some example corpuses:

A The Oxford English Corpus (OEC)
B Corpus of Contemporary American English (COCA)
C All words in a system subscriber database
D Public Houses in Abbotsbury Road
E All editions of The Times Newspaper printed in 1934
F An email message If we take example D, the corpus comprises The Dog and Fox
The King of Denmark
The King and Queen
The King's Head There are a total of 15 words, 8 of them different.

The frequency list is as follows:

| Word | Frequency | Probability of Occurrence |
|------|-----------|---------------------------|
| the  | 4         | 4/15 = 0.267              |
| King | 3         | 3/15 = 0.200              |
| and  | 2         | 2/15 = 0.133              |

-continued

| Word | Frequency | Probability of Occurrence |
|---|---|---|
| Dog | 1 | 1/15 = 0.067 |
| Fox | 1 | 1/15 = 0.067 |
| Denmark | 1 | 1/15 = 0.067 |
| Queen | 1 | 1/15 = 0.067 |
| Head | 1 | 1/15 = 0.067 |

We define a keyword as a word from a frequency list with a probability of occurrence below a particular threshold. In the above example, if the threshold was 0.1, then the words Dog, Fox, Denmark, Queen and Head, would be keywords so that if we analysed the phrase "The Queen's Head", we would find that "Queen" and "Head" were keywords but "The" is not.

In any individual message, once we have reduced the set of words in the message to a set of Q keywords (relative to a particular corpus and probability of occurrence) we define a "Message-Keyword" Table as:

| Keyword KM(n) | Frequency of occurrence FOM(n) | Probability of occurrence PEM(n) |
|---|---|---|
| KM(1) | FOM(1) | POM(1) = FOM(1)/w |
| KM(2) | FOM(2) | POM(2) = FOM(2)/w |
| . | . | . |
| KM(n) | FOM(n) | POM(n) = FOM(n)/w |
| n = total number of unique keywords | $w = \sum_{k=1}^{k=n} FOM(k)$ | $w = \sum_{k=1}^{k=n} FOM(k) = 1$ |

The probability of occurrence of keyword n, POM(n), is the statistical probability that a keyword chosen at random from the message will be keyword n.

We may combine Message-Keyword tables from a set of S seed messages into Job-Keyword table.

| Keyword K(n) | Number of messages containing keyword MJ(n) | Spread SJ(n) | Relevance RJ(n) | Weight WJ(n) | Normalised Weight NWJ(n) |
|---|---|---|---|---|---|
| KJ(1) | MJ(1) | SJ(1) = MJ(1)/S | RJ(1) | WJ(1) = SJ(1)*RJ(1) | WJ(1) = SJ(1)/TWJ |
| KJ(2) | MJ(2) | SJ(2) = MJ(2)/S | RJ(2) | WJ(2) = SJ(2)*RJ(n) | WJ(2) = SJ(2)/TWJ |
| . | . | . | | | |
| . | . | . | | | |
| KJ(n) | MJ(n) | SJ(n) = MJ(n)/S | RJ(n) | WJ(n) = SJ(n)*RJ(n) | WJ(n) = SJ(n)/TWJ |
| n = total number of different keywords | | | | $TWJ = \sum_{k=1}^{k=n} SJ(k)$ | $\sum_{k=1}^{k=n} WJ(k) = 1$ |

The Relevance, RJ(n) may be a constant (eg 1) or some function of the distribution of keywords across the test message and/or within/across seed messages. For example, certain types of word may have higher relevances thus:

| Type number | Description | Relevance |
|---|---|---|
| 1 | artifact | 0 |
| 2 | unclassified | 1 |
| 3 | email address | 2 |
| 4 | telephone number | 2 |
| 5 | word in subject | 2 |

Additionally or alternatively, messages whose keyword distribution differs markedly from the seed messages may have its relevance reduced. The actual algorithm for measuring relevance will depend on the type of user and corpus in use.

We define Fit, F between Message-Keyword table (test message) and a Job-Keyword table as:

| Keyword KM(n) | Does keyword exist in Job-Keyword table | Score KS(n) |
|---|---|---|
| KM(1) | E = 1 if yes<br>E = 0 if no | KS(1) = WJ(1) × E |
| KM(2) | E = 1 if yes<br>E = 0 if no | KS(2) = WJ(2) × E |
| . | . | . |
| KM(n) | E = 1 if yes<br>E = 0 if no | KS(n) =WJ(n) × E |
| n = total number of unique keywords in test message | | $F = \sum_{k=1}^{k=n} KS(k)$ |

Any given message will have a fit to every existing job. When a new message is ingested, unless it has been associated with a job manually or by reference, it will not be a seed message for any Message-Job table.

At any time, however, users can invoke a process to compare the Message-Job table of the test message with the set of Message-Job tables. The system will then rank the Jobs in order of best fit. At this point, the user may elect to manually associate the test message with one or more jobs and thereby include them in the Message-Job tables of the chosen jobs.

Figure 14:
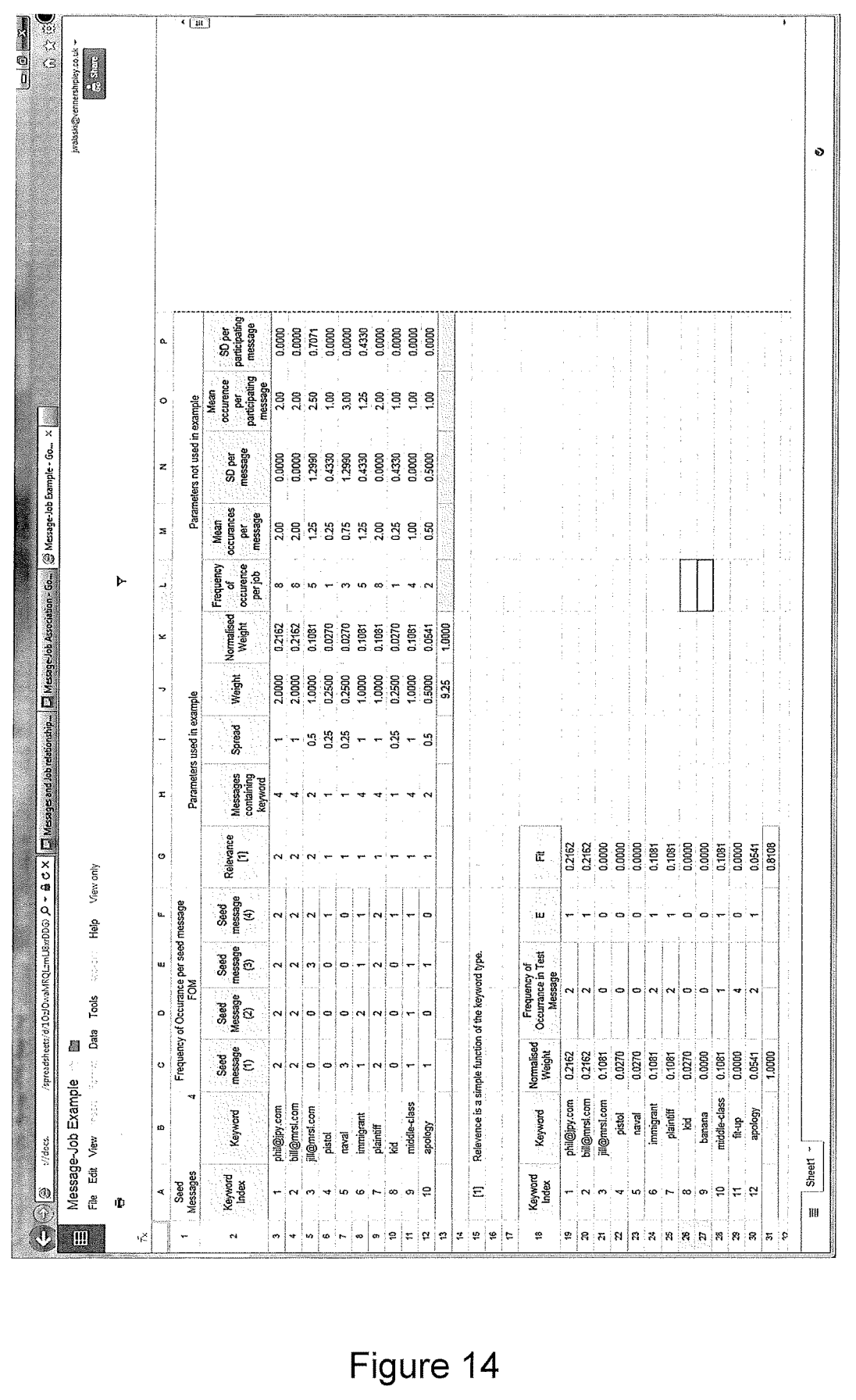

FIG. 14 is a spreadsheet showing a worked example of how a test message is compared and scored against a job.

2.17 Adaptive Keyword Extraction

The objective of finding keywords within messages is to reliably classify messages according to job so that most of the time the user is confirming the automatic classification.

In order to make this process as reliable as possible, it is important to choose keywords with a high information content that maximise the "distance" between jobs.

In the simplest case, keywords can be identified as not belonging to a common words directory. The method works to a varying extent, but has the disadvantage that it is dependent on the dictionary which, in turn is dependent on the message language. If a variety of languages are used, the problem is compounded further.

With adaptive keyword extraction, all words are extracted from all messages available over a fixed period. A histogram is then constructed for each word.

As new jobs are added the keywords will adapt to the period preceding the time the new job is added.

2.18 Attachment Metadata Extraction (Enhanced Metadata Support)

Email attachments often contain a significant amount of relevant metadata but due to the varying application formats, this metadata is not available for keyword analysis.

However, there are a number of specialist applications that provide metadata filters for many application-specific files. These filters can be applied selectively according to subscriber needs and resources and the metadata aggregated with that available from message bodies.

2.19 Generic Domain Extraction

It is important not to misclassify unknown contacts with email addresses originating from generic domains. (e.g. "gmail.com", "hotmail.com", etc). While many known contacts will have contact channels with generic domains, it is not wise to assume that an unknown contact might have, as a parent, any known company with contact channels having the same generic domain.

The technique adopted by the system according to aspects of the present invention is to find the distribution of domains (excluding the country code) across companies and to calculate the ratio of addresses to companies. Those with a company/address ratio above 1.2 are likely to be generic. It may be assumed that these domains are generic no matter what country code is used.

Domains are always considered to be generic until a representative sample set of channels has been built up.

2.20 Speech Premonition

Figure 15:
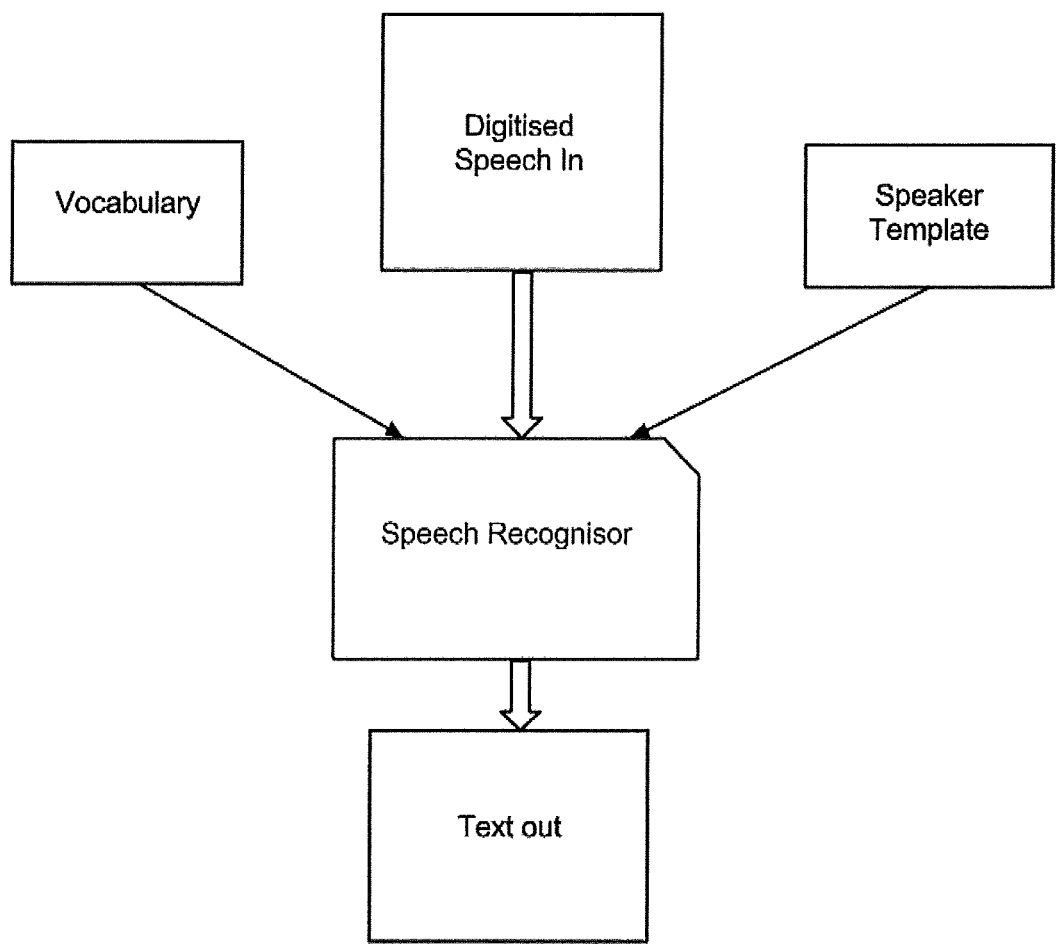
FIG. 15 illustrates a generic speech recognition system.

An Automatic Speech Recognition (ASR) system (see FIG. 15) may be generalised as a black box taking digitised speech in and outputting text. The recognition parameters are the vocabulary of words that may be recognised and the phonetic profiles of the speakers that are expected to utter the words.

Generally, the more phonetically diverse the vocabulary and phonetically similar the speaker profiles, the better the recognition performance.

Rather than the general case of a speech dictaphone where the vocabulary is large, the system according to aspects of the present invention can provide a reduced vocabulary based upon the keyword statistics obtained from existing messages.

Furthermore, it is often the case that a large number of digitised samples are readily available that can be used for training. This is described as speech premonition because the words uttered can often be predicted.

2.21 Speaker Premonition

Speaker identities are available either from telephone addressing information—caller line identity, personal mobile numbers, etc—or can easily be confirmed by the user engaged in the conversation (see 2.11 Click identification).

Figure 16:
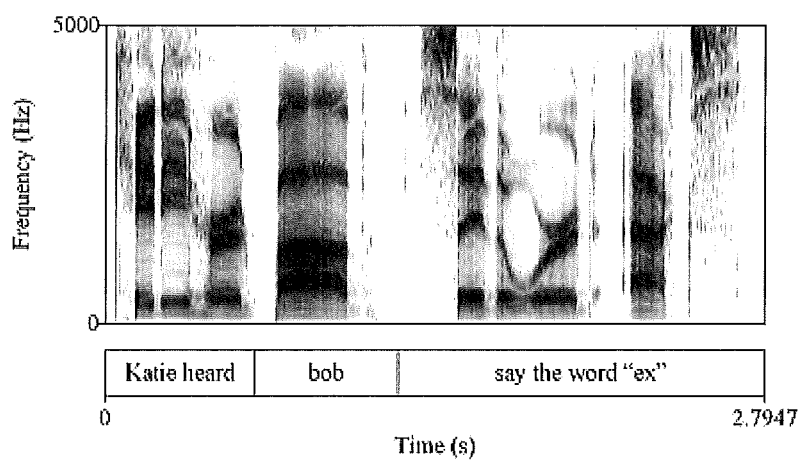
FIG. 16 illustrates a speech spectrogram.

The issue remains of separating the parties involved in a full-duplex conversation. In some cases, for example the SIPP protocol, the caller and called are separated on different logical channels, so it is straightforward to isolate each speaker. Similarly, some PBX systems separate the audio call recordings by speaker.

Where this is not available, the system according to aspects of the present invention adopts a method of providing a frequency histogram (spectrogram) of the complete call over discrete time quanta—typically one second. This is illustrated in FIG. 16.

By comparing spectrograms it is possible to attribute segments of speech to one or another speaker. Provided representative spectrograms are stored against the contact record, these can be used for future dialogue segmentation, or as importantly, to provide speaker information to the ASR algorithm.

2.22 Response Reminders

This is a method which enable user or even third party contacts to tag messages with meta data indicating that a response is expected within a defined period.

When the system detects the meta data, it waits the required period for a response and if no response is detected, then a system generated reminder is sent.

The application of this is to prevent important messages from going unanswered for some reason. For example customer requests for quotations, meeting legal deadlines, etc. One of the novel abilities of the system according to aspects of the present invention is to be able to associate related messages and to intelligently detect if a response has been made. In normal messaging systems, it is possible only to establish if specific messages to specific contacts are responded to, and then no account is taken of the content of the response. The system according to aspects of the present invention, on the on the other hand, is capable of detecting response from different contacts—perhaps made by proxy.

2.23 Simple Mail Merge

A mail merge is the process combining formatted text with a list of email addresses to generate personalised bulk emails.

Although there are many commercial services available for this, they require the uploading of the mailing list and mostly provide only html formatted mailers. html is perfect for intricate and/or creative designs but is highly susceptible to being rejected as spam. The simple mail merge facility of the system makes it possible to generate a simple personalised plain text mail merge directly from contact channels available.

2.24 Thread Journalling

A common requirement in many organisations is to concatenate several message in a given thread into a convenient report. Solicitors, for example, may wish to create a document of various messages from many contacts that is easy to navigate and does not contain much duplicated information. The system according to aspects of the present invention provides a perfect mechanism for defining the thread of messages—either a search selection or a project. However, simply printing all the messages sequentially results in a cumbersome document that is difficult to navigate.

Thread journaling is the process of removing duplicated information from sequential messages. This is necessary because messages often become the threads in their own right, with each response concatenating previous messages to assist the reader. However, when every message is included this can, depending on the number of messages, vastly bloat the document and make it unwieldy.

Once the messages are reduced to contain only new information, they are paginated and a contents page appended to the front of the document to assist easy location.

The contents page includes recipient list, date, time, subject and the page on which the abbreviated message may be found.

A number of business oriented examples are described below in which the features of the system are explained.

EXAMPLE 1

This example illustrates how a system according to an embodiment may:

1. Identify seemingly disparate messages from different contacts and relate them to the same project.
2. Extract information in historic messages to improve the information extracted from future messages. For example in identifying an individual caller when no caller metadata (eg caller's personal number) is available.
3. Identify two different companies as being involved in the same project.

A company called Acme Widgets using the system 1 receives three email enquiries from a company called Bradshaw Pinchucks, with which it has not previously dealt. The enquiries are made by George, Helen and Peter. Bradshaw Pinchucks are tendering for supply of spring washers for a new North Sea Oil Rig.

For each email enquiry, the context extraction system 2 extracts keywords from each 3o email. For example, the key words may be "Bradshaw Pinchucks", "spring washers", "North Sea Oil Rig" and the names 'George', 'Helen' and 'Peter'.

The selection of keywords is based upon the fact that each keyword is either a proper noun (in the grammatical sense), or a word uncommonly used in general English. Tables of word frequency are a standard resource. Of course, there is no guarantee that a message might be in English nor that data is available on the relative frequency of words in the language used. In these cases, probabilities of occurrence can be computed from historic messages. The keywords for each message are stored in a table.

Not having received a response as soon as he would like, George telephones Acme. Jim, a salesperson at Acme takes George's call and enters the contact details for Bradshaw into the system 1. Having done this, he sees the previous 3 email enquiries—some of which were sent to other staff. Jim then discusses the project in some detail with George and informs George that 2 of his colleagues have also made enquiries. George was unaware of this.

Jim then calls Helen and Peter apologising for not dealing with their enquiry quicker, but explaining that he is now dealing with George. Helen and Peter are surprised because they too did not know that any of their colleagues had made enquiries. They are impressed that Jim discovered this.

The system 1 extracts keywords from each phone call and email and also records voiceprints of George, Helen and Peter which it stores along with their customer record.

Jim creates a new project in the system 1 called the "North Sea Oil Rig" and links all of the messages and calls between Acme and Bradshaw to the project.

Jim later receives a phone call from Helen. Because Helen called from the Bradshaw switchboard number, it is not evident which, if any of the existing Bradshaw employees has made the call. However, once the call has completed, the system 1 compares the voiceprint of the caller, with that of George, Helen and Peter. The system 1 decides it is sufficiently similar to the voiceprint of Helen to be Helen. Since Helen works for Bradshaw, and there is only one project involving Bradshaw, the system deems it is likely that Jim and Helen are discussing the North Sea Oil Rig. The system thus analyses the phone call using this information and is therefore able to extract much higher quality information than where the speaker and vocabulary are unknown.

Following the phone call, the system 1 allows Jim to confirm whether in fact the caller was Helen and the project was the North Sea Oil Rig. If Jim confirms this, then the message is added to those known to be associated with this project. Jim has the option of associating the call with a different project, or not associating it with a project at all.

Later, Jim receives an email enquiry from an existing customer, Harry—who works for Catalytic Seals. The system determines that many of the keywords in the email are the same as those in the North Sea Oil Rig project, indeed, more than any other project recorded in the system 1. Jim quickly establishes that Catalytic Seals are also involved in the project.

Example 2

This example illustrates how the system 1 may be used to locate important strategic information otherwise hidden from an individual employee.

Jim from Acme Widgets has received a message to call a customer, Bradshaw Pinchucks, and quote for a special one-off item, a "chamfered toggle".

Since this is not a price list item and it is possible that the item has been previously is quoted for, Jim wishes to investigate before calling back the customer. It might cause his company to lose money or damage their reputation to quote a different price for the same item.

Jim searches his own email to look for all occurrences of "chamfered toggle", but finds nothing. He realises that a colleague may have quoted, and/or a different customer contact may have requested the quote.

Jim then turns to the system 1 and searches all messages in and out of the company that contain the words "chamfered toggle". He finds thousands of occurrences, but when he reviews the related projects, he finds only one. However, this project does not involve any messages to or from Bradshaw Pinchucks, even though "Bradshaw Pinchucks" is identified as a keyword. He then browses the messages in the project and sees from the sequence of messages that Bradshaw Pinchucks has been subcontracted, although their name is not mentioned in the actual message requesting a quotation.

Thus, in a short space of time, Jim is able to establish that a quotation for the same item has been given to another related company, and he is able to ensure that his quotation tallies with the previous quotation.

In summary, a system 1 according to embodiments of the invention may provide the following features:

1. A symmetrically searchable database: A database schema which automatically relates 4 tables—messages, contacts, companies and jobs—such that searches and selections on any one table will result in an automatic selection of the other related tables.
2. The channel: A schema for relating companies to contacts and contacts and companies to messages
3. Contact normalisation: A schema for normalising contacts such that a single contact may be related to an unlimited number of companies via an unlimited number of channels.
4. Company normalisation: A schema for normalising companies such that many departments (or geographical addresses) may be related to the same legal entity.
5. Message abstraction: A method for the abstraction of a message medium (eg email, phone call, text) in such a way that messages may be searched and sorted identically.

6. Ingestion: A method for merging several streams of disparate digital messages into a single database.

7. Channel attribution: A schema for describing channels according to the subscribers' and users' privacy and security requirements.

8. Familiarity classification: A schema for the classification and selection of messages according to the subscribing company's relationship with the message sender/recipients in the categories "contacts I know", "contacts I might know", "contacts I don't know" (also called orphans) or "inactive contacts" and a novel user interface analogous to a traffic light system.

9. Orphan message caching: A method for retaining (or caching) all messages with exclusively orphan senders or recipients (excluding users) for a subscriber-defined period such that if the sender or recipient becomes known within that period, the previously cached messages are reclassified.

10. Orphan message privatisation: A method of rendering messages between individual users and exclusively orphan contacts as viewable only by the user contained in the address.

11. Click association: A method for the quick and easy association of a message of unknown origin with a known company, contact or job.

12. Manual job association: A method of associating a message with a job manually.

13. Token job association: A method for classifying messages into jobs according to a unique token or reference contained within the message.

14. Tag job association: A method for associating messages into jobs according to a rule for establishing the existence of a user-defined tag.

15. Regex job association: A method for creating jobs and associating messages with jobs according to a regular expression as specified by a privileged user.

16. Statistical job association: A method for classifying messages into jobs according to statistical rules inferred from existing known associations between previous messages and jobs and displaying as list of possible jobs ordered according to probability.

17. Adaptive keyword extraction: A method for extracting keywords (uncommon words) from messages to construct statistical profiles of words used by known contacts.

18. Attachment metadata extraction: The process of extracting keywords and metadata from various disparate form of documents and extending the context of the message.

19. Generic domain extraction: A method for identifying message address domains as generic (eg. hotmail.com, gmail.com, etc)

20. Speech premonition: A method of applying arbitrary speech recognition algorithms to convert digitised acoustic messages (eg phone calls) into text strings using voice patterns of known contacts and a pattern-matching technique to match keyword statistics from historical text messages involving such contacts.

21. Speaker premonition: A method of identifying individual contacts from voice messages using shared company channels (eg switchboard numbers) using arbitrary voice recognition algorithms applied to a set of known contacts.

22. Automatic response reminders: A method of checking that certain contact-defined messages are responded to within a contact-defined period.

23. Simple Mail Merge: A method to generate a quick and simple personalised plain text (not html) mailshots.

24. Thread Journalling: A process for the creation of a summary report of message threads which removes duplicated information.

It will be apparent to the skilled person that while several embodiments of the invention have been described, the invention is not limited to those embodiments, and various modifications and improvements are possible while still falling within the scope of the invention as defined by the claims.

The invention claimed is:

1. A digital messaging system arranged to unify a plurality of digital messages from a plurality of sources, wherein the messages comprise digital communications between two or more contacts, each contact associated with a company, the system comprising:

a database for storing tables that comprise companies, contacts, messages and jobs, the jobs being related to the companies, contacts and messages, the database being symmetrically searchable such that a search on one of the tables results in an automatic search on related items in the other tables;

a context extraction module arranged to extract context information from the messages to determine the context of the messages, wherein the context information comprises one or more keywords associated with the messages;

a message classification module arranged to classify the messages according to the determined context of the messages;

means for assigning each of the messages to a message group that has the same context as the determined context of the message being assigned; and an automatic speech recognizer arranged to use the extracted context information to convert a portion of digitised speech into one or more keywords that corresponds to the context, wherein the context includes the job to which the message is related and at least one of a sender and a recipient of the message;

the keywords comprise one or more words extracted from the messages where the probability of occurrence of the one or more words is less than a predetermined threshold value;

the keywords are associated with at least one previously received message where a speaker identity associated with at least one previously received message is the same as a speaker identity associated with the digital messages; and the system is arranged to exclude messages from a message group based on a user's security settings.

2. A digital messaging system arranged to store a plurality of first messages associated with a context, the system comprising:

a database for storing tables that comprise companies, contacts, messages and jobs, the jobs being related to the companies, contacts and messages, the database being symmetrically searchable such that a search on one of the tables results in an automatic search on related items in the other tables;

a context extraction module arranged to extract context information from one or more of the first messages to determine the context of the first messages, wherein the context information comprises one or more keywords associated with the messages;

a message classification module arranged to classify the messages according to the determined context of the first messages;

means for assigning each of the messages to a message group that has the same context as the determined context of the message being assigned; and a speech recognizer arranged to use the extracted context information to convert a portion of digitised speech in a second message into one or more keywords that correspond to the context, wherein the context includes the job to which the message is related and at least one of a sender and a recipient of the message;

the keywords comprise one or more words extracted from the messages where the probability of occurrence of the one or more words is less than a predetermined threshold value;

the keywords are associated with at least one previously received message where a speaker identity associated with at least one previously received message is the same as a speaker identity associated with the digital messages; and the system is arranged to exclude messages from a message group based on a user's security settings.

3. The system of claim 2, arranged to store the second message in a group of messages that are associated with the context.

4. The system of claim 2, arranged to identify the speaker from telephone addressing information.

5. The system of claim 2, further comprising a speech analyser arranged to analyse speech waveforms to identify the speakers.

6. The system of claim 4, arranged to store messages in association with the speaker identified as uttering the message.

7. The system of claim 4, wherein the speakers are selected from a database of individual contacts.

8. The system of claim 2, further comprising a user interface arranged to permit a user to associate a message with a message group, wherein the user interface is arranged to permit the user to confirm that the message should be associated with a message group that has the same context information as the message.

9. A method of operating a digital messaging system to unify messages from a plurality of sources, wherein the messages comprise digital communications between two or more contacts, each contact associated with a company, the method comprising:

extracting context information from one or more of the first messages to determine the context of the first messages, wherein the context information comprises one or more keywords associated with the first messages;

classifying the first messages according to the determined context of the message being assigned;

assigning each of the first messages to a message group that has the same context as the determined context of the message being assigned;

using the extracted context information to convert a portion of digitised speech in a second message into one or more keywords that correspond to the context, wherein the context includes the job to which the message is related and at least one of a sender and a recipient of the message; and storing tables in a database, the tables comprising companies, contacts, messages and jobs, the jobs being related to the companies, contacts and messages, the database being symmetrically searchable such that a search on one of the tables results in an automatic search on related items in the other tables, wherein the keywords comprise one or more words extracted from the messages where the probability of occurrence of the one or more words is less than a predetermined threshold value;

the keywords are associated with at least one previously received message where a speaker identity associated with at least one previously received message is the same as a speaker identity associated with the digital messages; and the system is arranged to exclude messages from a message group based on a user's security settings.

10. The method of claim 9, wherein the extracted context information comprises first keywords, comprising using the first keywords as a vocabulary for converting the digitized speech into second keywords.

11. The method of claim 9, comprising:

storing voice recordings; and applying speech recognition to the voice recordings only in response to a search for information by a user.

* * * * *